United States Patent [19]

Okamoto et al.

[11] Patent Number: 4,814,683
[45] Date of Patent: Mar. 21, 1989

[54] INDUCTION MOTOR CONTROL APPARATUS

[75] Inventors: Kiyokazu Okamoto; Hideyuki Amagai; Teruaki Itai, all of Tokyo, Japan

[73] Assignee: NEC Corporation, Japan

[21] Appl. No.: 77,162

[22] Filed: Jul. 24, 1987

[30] Foreign Application Priority Data

Jul. 25, 1986 [JP] Japan .................. 61-175318

[51] Int. Cl.$^4$ ............................... H02P 5/40
[52] U.S. Cl. ..................... 318/800; 318/803
[58] Field of Search ............ 318/800-803, 318/807-811

[56] References Cited

U.S. PATENT DOCUMENTS

| | | | |
|---|---|---|---|
| 4,240,020 | 12/1980 | Okuyama et al. | 318/800 |
| 4,409,534 | 10/1983 | Bose | 318/811 |
| 4,451,771 | 5/1984 | Nagase et al. | 318/800 |
| 4,456,868 | 6/1984 | Yamamura et al. | 318/800 |
| 4,459,534 | 7/1984 | Nagase et al. | 318/803 |
| 4,503,375 | 3/1985 | Okuyama | 318/808 |

*Primary Examiner*—David Smith, Jr.
*Attorney, Agent, or Firm*—Ostrolenk, Faber, Gerb & Soffen

[57] ABSTRACT

An induction motor control apparatus includes a detector, a memory, a correction current generator, and a primary current correction circuit. The detector detects a rotational position of a rotary magnetic flux generated by a multi-phase primary current applied to a primary winding of an induction motor. The memory stores correction values corresponding to measured values of torque ripples periodically generated in correspondence with the rotational positions of the magnetic flux, receives an output from the detector for detecting the rotational position of the magnetic flux, and outputs one of the correction values stored in the memory in correspondence with the rotational position. The correction current generator generates a correction current by the correction value read out from the memory in correspondence with the rotational position of the magnetic flux. The primary current correction circuit corrects the primary current by the correction current.

8 Claims, 6 Drawing Sheets

INDUCTION MOTOR CONTROL APPARATUS

BACKGROUND OF THE INVENTION

The present invention relates to an induction motor control apparatus and, more particularly, to an induction motor control apparatus wherein the smoothness of rotation of an induction motor at a low speed can be greatly improved.

Conventional induction motors have served as constant-speed motors using a power source having a predetermined frequency and have been used in a variety of applications in favor of rigidness and low cost.

Along with the recent development of electronic devices, microcomputers, and software, a power source having a wide variable frequency range on the basis of vector control (to be referred to as a "driver" hereinafter) can be provided as a power source for driving induction motors. Therefore, induction motors have been popular as servo motors. The above driver is vector-controlled on the basis of the following principle.

The fundamental equations used in vector control are given by a torque current $i_{1q}$, an excitation current or a magnetic flux component current $i_{1d}$ for generating a secondary flux $\Phi_2$, and a slip speed $\omega_s$ as follows:

$$i_{1q} = (L_2/M)(T/\Phi_2) \quad (1)$$

$$i_{1d} = \{\Phi_2 + (L_2/R_2)(d\Phi_2/dt)\}/M \quad (2)$$

$$\begin{aligned}\omega_s &= T(R_2/\Phi_2{}^2) \\ &= (R_2/L_2)(i_{1q}/i_{1d})\end{aligned} \quad (3)$$

where $L_2$ is the secondary inductance, M is the mutual inductance, T is the torque, $\Phi_2$ is the secondary magnetic flux, and $R_2$ is the secondary resistance.

The torque T in equations (1) and (3) is an instruction value applied to the vector control apparatus for vector control. The secondary magnetic flux $\Phi_2$ is a preset value determined in advance.

The torque T is derived from equations (1), (2), and (3) as follows:

$$T = (M^2/R_2)\omega_s i_{1d}{}^2 = (M^2/L_2)i_{1d}i_{1q} \quad (4)$$

After the slip speed $\omega_s$, the torque current $i_{1q}$, and the excitation current $i_{1d}$ are thus determined, they are used to control a so-called inverter which supplies power to the induction motor in such a manner that the induction motor can be driven to provide desired characteristics.

FIG. 1 is a block diagram showing a conventional basic arrangement of a slip frequency vector control apparatus to realize the above-mentioned principle.

Referring to FIG. 1, reference numeral 1 denotes a speed control amplifier; 2, a divider; 3, a constant multiplier; 4, a vector analyzer; 5, a multiplier; 6, a converter; 7, a current control amplifier; 8, a power converter; 9, an induction motor; 11, a speed sensor; 12, a differentiator; 13, 14, 15, and 16, constant multipliers; 17, a divider; 18, a vector oscillator; and 19 and 20, adders.

In operation, an output from the speed control amplifier 1 is provided as a torque instruction $T_M{}^*$. The torque instruction $T_M{}^*$ is divided by the secondary magnetic flux instruction $\Phi_2{}^*$ in the divider 2 to obtain a secondary q-axis current instruction $-i_{2q}{}^*$. The constant multiplier 3 multiples the instruction $-i_{2q}{}^*$ with constant $L_2/M$, thereby deriving a torque component current instruction $i_{1q}{}^*$.

A magnetic flux component current instruction $i_{1d}{}^*$ is derived from the secondary magnetic flux instruction $\Phi_2{}^*$ as follows. In order to compensate for primary delay of the secondary flux $\Phi_2$ from a magnetic flux component current $i_{1d}$, a current for generating the secondary flux obtained by multiplying the secondary flux instruction $\Phi_2{}^*$ with 1/M in the multiplier 15 is added to a current for forcing the secondary flux proportional to a rate of change in time of the secondary flux instruction $\Phi_2{}^*$ through the differentiator 12 and the multipliers 13 and 14 to obtain the magnetic flux component current instruction $i_{1d}{}^*$.

A slip frequency instruction $\omega_s{}^*$ is calculated using the secondary flux instruction $\Phi_2{}^*$ and the secondary q-axis current instruction $-i_{2q}{}^*$. A real speed $\omega_r$ from the speed sensor 11 is added to the slip frequency instruction $\omega_s{}^*$ by the adder 20 to obtain a secondary flux speed $\omega_0{}^*$ which is then input to the vector oscillator 18. Therefore, a unit vector $_e j\theta_0{}^*$ representing a predictive position $\theta_0{}^*$ of the secondary flux is generated by the vector oscillator 18.

A primary current vector $i_1{}^*(\theta_0{}^*)$ determined by the torque component current and the magnetic flux component instruction value and plotted on the secondary magnetic flux coordinate system is multiplied with the unit vector $_e j\theta_0{}^*$ by the multiplier 5 and is thus converted into a primary current vector $i_1{}^*$ on the fixed coordinates. The primary current vector $i_1{}^*$ is 3-phase converted to obtain current instruction values $i_u{}^*$, $i_v{}^*$, and $i_w{}^*$ of the respective phases, thereby causing a current control loop to control the current control amplifier 7 and the power converter 8.

Changes in the instantaneous induction motor torque can be controlled as a function of the instantaneous current.

However, in the "slip frequency vector control apparatus" shown in FIG. 1, the following problems are posed when the induction motor serves as a servo motor. Smooth rotation, i.e., a small rotational variation of the servo motor is required in a low speed range when high-precision control such as table feeding for finishing in a machine tool is to be performed. For this purpose, a rated torque must be generated during the operation of the induction motor. A torque $T_G$ during the operation of the induction motor must be substantially equal to a steady, constant (without irregularity) loading torque $T_L$ when the induction motor is operated generating the torque $T_L$. In other words, if the relation $T_G = T_L + \Delta T$ is established, the torque ripple $\Delta T$ must be minimized. It should be noted that the cause of the torque ripple $\Delta T$ is a magnetomotive force due to harmonic components with respect to space and time of a frequency $f_1$ of the primary current supplied from the driver to the primary winding of the induction motor.

In a driver for generating electric energy having a simple 3$\Phi$ rectangular voltage waveform, electric energy includes harmonic components with respect to time of $6k \pm 1$ times ($k = 1, 2, 3, \ldots$) the primary frequency $f_1$. Therefore, the torque ripple components of the frequency of $6kf_1$ are naturally generated in the force wave proportional to the torque $T_G$ of the induction motor.

Along with recent developments of electronic devices (e.g., LSIs and power-controlled semiconductor elements), sensors (e.g., current, speed, and position sensors), and software techniques for high-precision, high-speed data processing, a driver capable of supplying electric energy having almost a sinusoidal wave in a variable frequency range has been commercially available in recent years.

When a primary current having a substantially ideal sinusoidal wave is supplied to an induction motor and the induction motor is operated in a wide range of primary frequencies $f_1$, frequencies of major components of the torque ripple are $2f_1$ and the like in a relatively high motor speed range. However, when the motor speed is reduced, the component $2f_1$ or the like is not so conspicuous. Instead, harmonic components $6kf_1$ typically appear.

FIG. 2 is a graph showing an induction motor torque spectrum measured by a torque spectrum sensor, and FIG. 3 shows a natural spectrum (multiples of 15 Hz and 50 Hz) of the torque spectrum sensor. In the torque spectrum of FIG. 2, hatched portions indicate influence of the torque spectrum sensor.

As is apparent from FIG. 2, torque ripples at frequencies of $2f_1$ and $6kf_1$ have large values. This phenomenon also occurs when the output is a sinusoidal wave in addition to the rectangular wave. No proper explanation is given for generation of torque ripples at frequencies of $6kf_1$ when the sinusoidal primary current is supplied to the induction motor. No effective countermeasures for this have been proposed.

However, the harmonic torque components $\Delta T$ at the frequencies of $6kf_1$ at almost zero speed are decisive drawbacks for high-precision servo motors.

SUMMARY OF THE INVENTION

It is an object of the present invention to provide an induction motor control apparatus capable of greatly reducing torque ripples corresponding to harmonic components $2f_1$ and $6kf_1$ of a frequency $f_1$ of the primary current $i_1$ of the induction motor.

An induction motor control apparatus according to the present invention comprises: means for detecting a rotational position of a rotary magnetic flux generated by a multi-phase primary current applied to a primary winding of an induction motor; memory means for storing correction values corresponding to measured values of torque ripples periodically generated in correspondence with the rotational positions of the magnetic flux, for receiving an output from the detecting means for detecting the rotational position of the magnetic flux, and outputting one of the correction values stored in the memory means in correspondence with the rotational position; means for generating a correction current by the correction value read out from the memory means in correspondence with the rotational position of the magnetic flux; and means for correcting the primary current instruction by the correction current, thereby greatly reducing the torque ripples of the induction motor.

DETAILED DESCRIPTION OF THE PREFERRED EMBODIMENT

An induction motor control apparatus according to an embodiment of the present invention will be described with reference to the accompanying drawings.

The principle employed in the present invention will be described prior to a detailed explanation.

Figure 4:
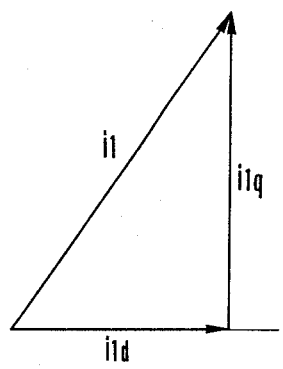
FIG. 4 is a chart showing the relationship between the primary current and its vector components.

As is well known, a primary current $i_1$ of an induction motor can be divided into vector components of an excitation current $i_{1d}$ and a torque current $i_{1q}$, as shown in FIG. 4.

Figure 2:
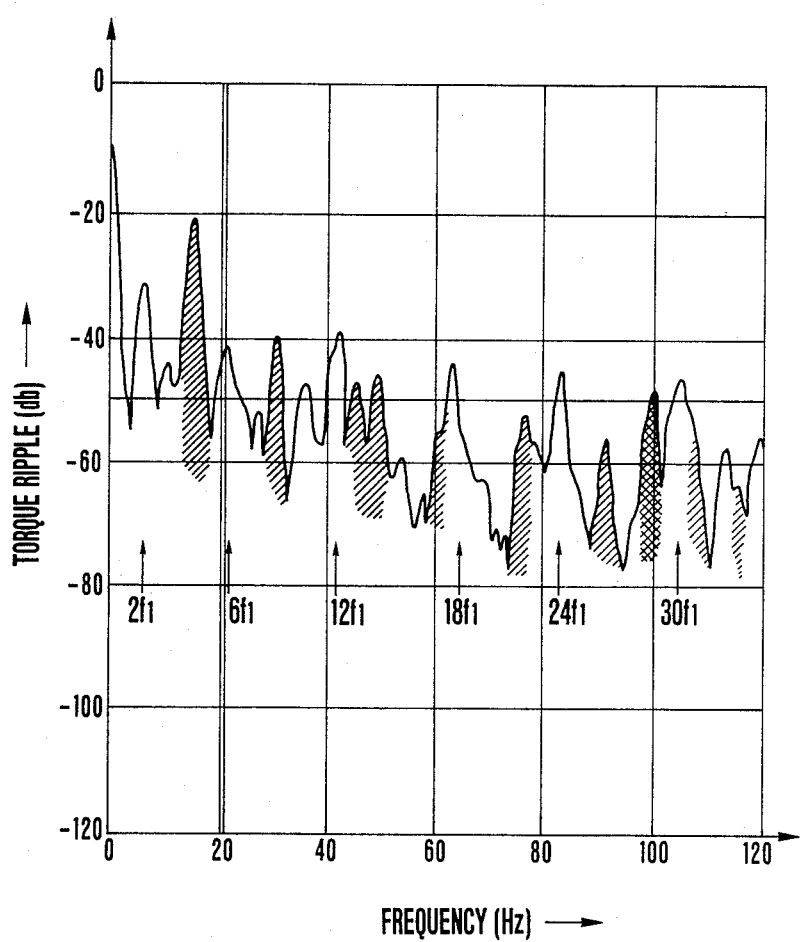
FIG. 2 is a chart showing a torque spectrum measurement result of a conventional induction motor.
Figure 3:
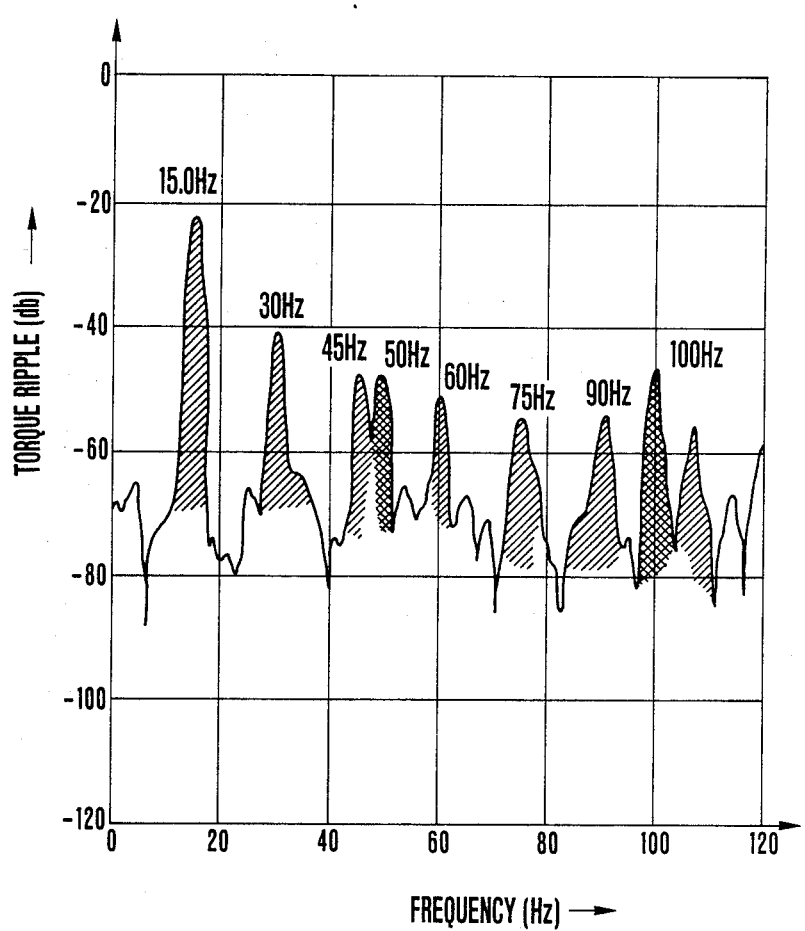
FIG. 3 is a chart showing a natural spectrum of a sensor used in measurement of FIG. 2.
Figure 5:
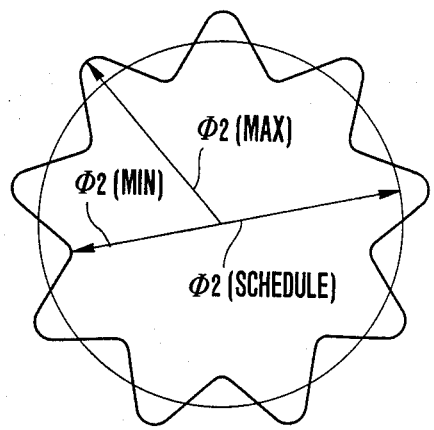
FIG. 5 is a chart for explaining fluctuations in the secondary flux of the induction motor.

In practice, the intensity of a secondary flux $\Phi_2$ of the induction motor is determined by the excitation current $i_{1d}$, as represented by equation (2). Even if the excitation current $i_{1d}$ is constant, the secondary flux $\Phi_2$ cannot be constant because of the electromagnetic structure of the motor and incompleteness of the current control loop action. As shown in FIG. 5, the secondary flux $\Phi_2$ fluctuates. The cycle of fluctuations in the secondary flux $\Phi_2$ is an electric angle of 60° or its integer multiple, as shown in FIGS. 2 and 3. This cycle was found during the development of induction motors by the present inventors.

As represented by equation (4), the torque can be defined by the excitation current $i_{1d}$ and the torque current $i_{1q}$. The present inventors achieved this invention on an assumption that smooth rotation could be achieved in the low-speed operation range of the induction motor when the excitation current $i_{1d}$ and the torque current $i_{1q}$ were properly controlled to reduce the torque ripples.

The induction motor control apparatus according to an embodiment of the present invention will now be described with reference to FIG. 6. The same reference numerals as in FIG. 1 denote the same parts in FIG. 6, and a detailed description thereof will be omitted.

Figure 1:
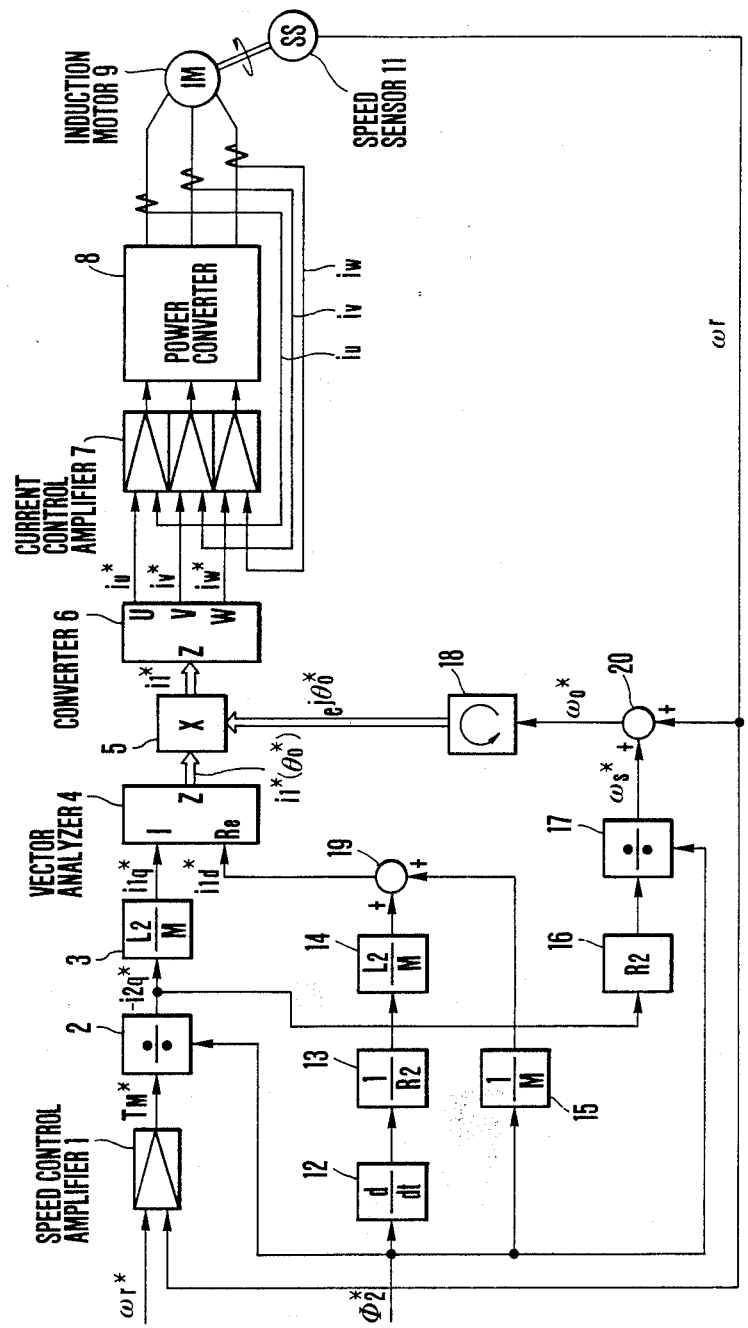
FIG. 1 is a block diagram showing a conventional technique.
Figure 6:
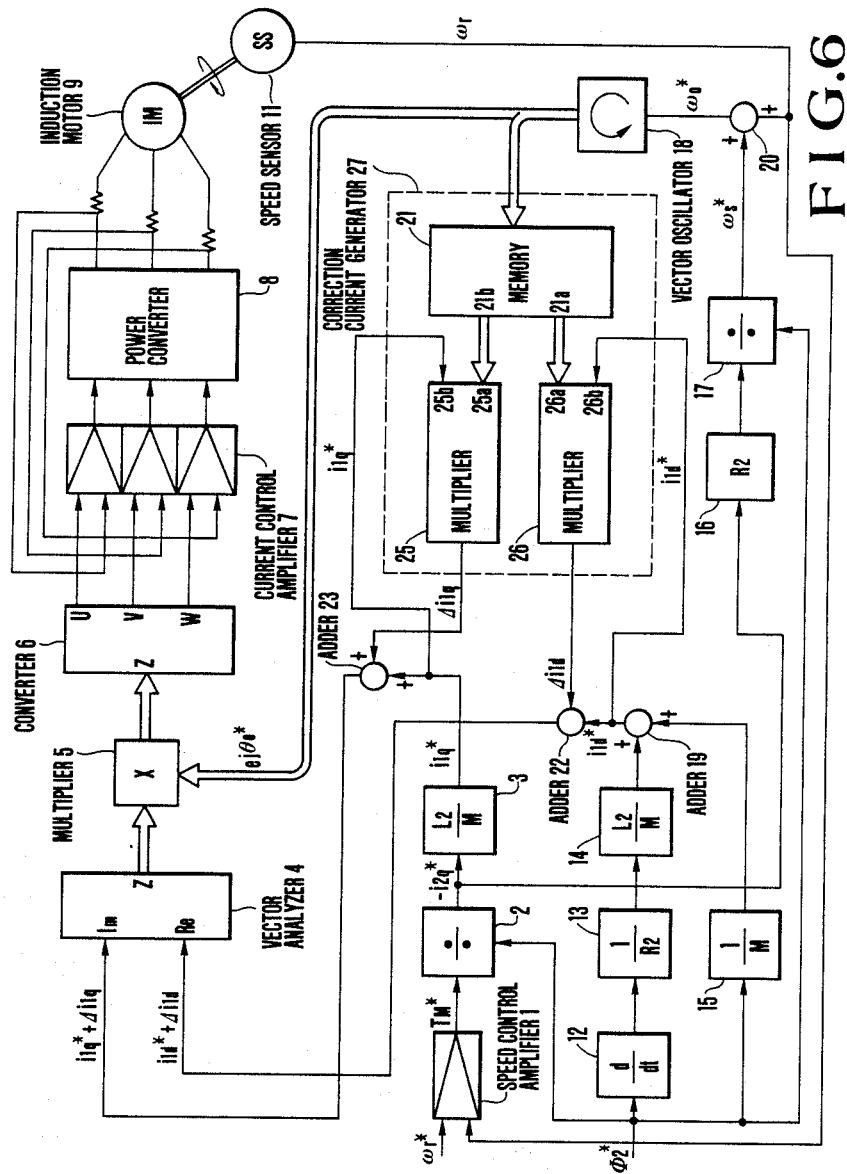
FIG. 6 is a block diagram of an induction motor control circuit according to an embodiment of the present invention.

The primary difference between the circuit of FIG. 6 and that of FIG. 1 resides in the correction current generator 27 which generates an excitation correction current $\Delta i_{1d}$ and a torque correction current $\Delta i_{1q}$ which are used to compensate for the torque ripples noted above. The excitation and torque correction currents are generated by multiplying the instantaneous torque excitation current instruction $I_{1d}^*$ and the torque current instruction $I_{1q}^*$ by predetermined correction values stored in the memory 21. The values stored in memory 21 are predetermined by measuring the torque ripple values for the motor being controlled utilizing a torque ripple sensor and determining the required correction values $\Delta i_{1d}/i_{1d}^*$ and $\Delta i_{1q}/i_{1q}^*$ for every predetermined incremental change in the rotational position $\theta_0$ of the rotary flux of the motor and storing the appropriate values in memory 21. In this way, memory 21 (and therefore correction current generator 27) are matched to the specific motor being controlled. The correction values are determined (and then stored in memory 21) in the manner described below.

An excitation current instruction $i_{1d}^*$ for an induction motor of interest is changed every unit value, and torque ripple values for the torque of the motor are measured by using a proper torque ripple sensor. A ratio $\Delta i_{1d}/i_{1d}^*$ of an excitation correction current $\Delta i_{1d}$ to the excitation current instruction $i_{1d}^*$ per ampere at each rotational position $\theta_0$ is calculated based on the measurement results. The calculated values that is, the correction values for the torque current instruction, are stored at addresses corresponding to positions $\theta_0$ in a memory 21.

Similarly, the torque current instruction $i_{1q}^*$ is changed every unit value, and a value corresponding to the motor torque is measured. A ratio $\Delta i_{1q}/i_{1q}^*$ of a torque correction current $\Delta i_{1q}$ to the torque current instruction $i_{1q}^*$ per ampere at each rotational position $\theta_0$ is calculated, and the calculated values are stored at addresses corresponding to the positions $\theta_0$ in the memory 21.

Referring to FIG. 6, the output terminal of a vector oscillator 18 is connected to the input terminal of a multiplier 5 and the memory 21. The instantaneous rotational positions $\theta_0$ of the rotary flux of the induction motor are stored in the memory 21 by using the rotational positions $\theta_0$ as address data. The ratio $\Delta i_{1d}/i_{1d}^*$ of the excitation correction current to the excitation current instruction $i_{1d}^*$ per ampere corresponding to the input rotational position $\theta_0$ is output from an output terminal 21a of the memory 21. Similarly, the ratio $\Delta i_{1q}/i_{1q}^*$ of the torque correction current to the torque current instruction $i_{1q}^*$ per ampere corresponding to the input rotational position $\theta_0$ is output from an output terminal 21b of the memory 21.

The output terminal 21b of the memory 21 is connected to one input terminal 25a of a multiplier 25. The other input terminal 25b of the multiplier 25 is connected to the output terminal of a constant multiplier 3. The output terminal of the multiplier 25 is connected to one input terminal of an adder 23. The other input terminal of the adder 23 is connected to the output terminal of the constant multiplier 3. The output terminal of the adder 23 is connected to an input terminal Im of a vector analyzer 4.

The output terminal 21b of the memory 21 is connected to one input terminal 26a of a multiplier 26. The other input terminal 26b of the multiplier 26 is connected to one input terminal of an adder 22 and to the output terminal of an adder 19 for outputting the excitation current instruction $i_{1d}^*$. The other input terminal of the adder 22 is connected to the output terminal of the multiplier 26. The output terminal of the adder 22 is connected to an input terminal Re of the vector analyzer 4.

The operation of the induction motor control apparatus having the arrangement shown in FIG. 6 will be described below.

The rotational position $\theta_0$ of the rotary flux of an indiction motor 9 during operation is instantaneously detected by the vector oscillator 18. The vector oscillator 18 generates a rotational position signal, indicative of the detected rotational position $\theta_0$ which is supplied as an address input to the memory 21. In response to the input rotational position signal, the correction values, that is the ratio of the excitation correction current $\Delta i_1 d$ to the excitation current instruction $i_{1d}^*$ per ampere and the ratio of the torque correction current $\Delta i_1 q$ to the torque current instruction $i_{1q}^*$ per ampere are supplied from the memory 21 to the multipliers 26 and 25, respectively.

The multipliers 25 and 26 generate the torque correction current $\Delta i_{1q}$ and the excitation correction current $\Delta i_{1d}$ which are respectively proportional to the torque current instruction $i_{1q}^*$ and the excitation current instruction $i_{1d}^*$.

The excitation correction current $\Delta i_{1d}$ is added by the adder 22 to the excitation current instruction $i_{1d}^*$ supplied from the adder 19. The sum $(i_{1d}^* + \Delta i_{1d})$ is supplied to the terminal Re of the vector analyzer 4.

The torque correction current $\Delta i_{1q}$ is added by the adder 23 to the torque current instruction $i_{1q}^*$ supplied from the constant setter 3. The sum $(i_{1q}^* + \Delta i_{1q})$ is supplied to the input terminal Im of the vector analyzer 4.

Correction operations for the torque current instruction $i_{1q}^*$ and the excitation current instruction) $i_{1d}^*$ are performed in the vector analyzer 4. The primary current vector $i_1^*(\theta_0^*)$ output from the vector analyzer 4 varies in accordance with the values of the excitation correction current $\Delta i_{1d}$ and the torque correction current $\Delta i_{1q}$. Accordingly, ripple-compensated primary current vector $i_1^*(\theta_0^*)$ is supplied from the analyzer 4 to the multiplier 5. In the same manner as described with reference to FIG. 1, the primary current components of the three phases are supplied to the induction motor 9 through a converter 6, a current-controlled amplifier 7, a power converter 8, and the like. Ripple-compensated current components are supplied to the induction motor 9, and the ripple-compensated current greatly reduces the difference between $\Phi_2(MAX)$ and $\Phi_2(MIN)$ shown in FIG. 5 and thus smooth rotation in the low speed range can be maintained.

In the above embodiment, the torque current instruction $i_{1q}^*$ and the excitation current instruction $i_{1d}^*$ of the primary current $i_1$ are corrected. However, both the components need not be corrected.

The torque correction current $\Delta i_{1q}$ is supplied from a correction current generator 27 consisting of the memory 21 and the multipliers 25 and 26 to the adder 23, and only the torque current instruction $i_{1q}^*$ can be corrected. In this case, the excitation correction current $\Delta i_{1d}$ for the excitation current instruction $i_{1d}^*$ is not output from the correction current generator 27. The excitation current instruction $i_{1d}^*$ as the output from the adder 19 is applied to the input terminal Re of the vector analyzer 4 without modifications.

To the contrary, the torque current instruction $i_{1q}^*$ need not be corrected and may be applied to the input terminal Im of the vector analyzer 4. In this case, the excitation correction current $\Delta i_{1d}$ for the excitation current instruction $i_{1d}^*$ is output from the correction current generator 27.

When the secondary flux $\Phi_2$ is electrically detected after the primary current $i_1$ is input to the induction motor 9, it causes delay for a predetermined period of time. This time lag is called an "electrical time constant".

Figure 7:
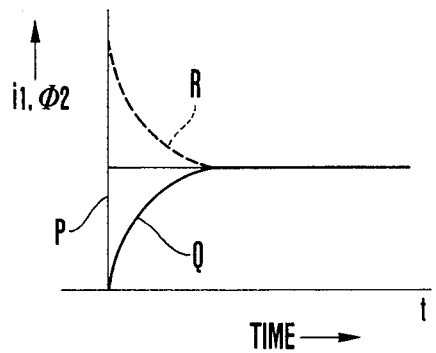
FIG. 7 is a chart showing the relationship between the primary current and the secondary flux.

When a stepwise signal indicated by reference symbol P in FIG. 7 is supplied as the primary current $i_1$, the secondary flux $\Phi_2$ rises with a time lag indicated by reference symbol Q due to the electric time constant. In this case, a signal indicated by reference symbol R is applied to the secondary flux $\Phi_2$, the above-mentioned time delay can be canceled. A compensation for the electrical time constant indicated by reference symbol R is called "advance compensation".

Figure 8:
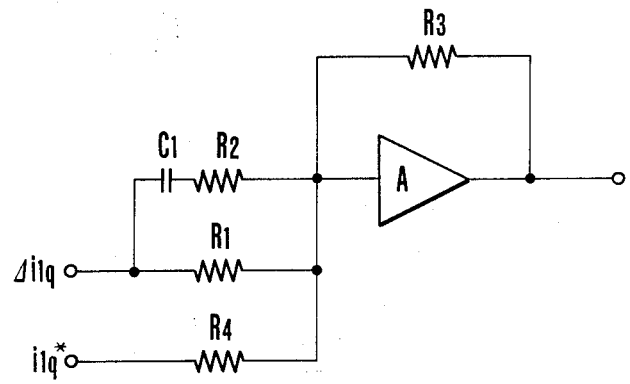
FIG. 8 is a circuit diagram showing an advance compensation circuit.

When correction represented by the correction current, e.g., $\Delta i_{1q}$ supplied from the correction current generator 27 shown in FIG. 6 is performed by the advance compensation circuit including resistors R1, R3, and R4, and an operational amplifier A, as shown in FIG. 8. Therefore, the delay in the electrical time constant can be reduced. The effect of the correction currents $\Delta i_{1q}$ and $\Delta i_{1d}$ is significant especially on the harmonic component having the period of 60° in electric angle (in case of k=1).

As described above, since the torque ripples in the very low speed range can be reduced according to the present invention, smooth rotation of the induction motor can be maintained in the low speed range.

What is claimed is:

1. an induction motor control apparatus comprising:
   means for generating a rotational position signal indicative of the rotational position of a rotary magnetic flux of an induction motor generated by a multi-phase primary current applied to a primary winding of the induction motor;
   memory means for storing correction values corresponding to predetermined measured values of torque ripples which are periodically generated as a function of the rotational positions of the magnetic flux for the motor being controlled and for outputting that correction value which corresponds to the rotational position of said rotary magnetic flux as indicated by the rotational position signal;
   means for generating a correction current as a function of the correction value outputted by the memory means; and
   means for correcting the primary current as a function of the correction current.

2. An apparatus according to claim 1, wherein
   the correction value is a correction current value of an instruction value of at least one vector component of a primary current per unit amount,
   said correction current generating means comprises at least one multiplier for multiplying each instruction value of said at least one vector component of the primary current with a corresponding correction current value stored in said memory means, and
   said primary current correcting means comprises an adder for adding said each instruction value of said at least one vector component of the primary current and a corresponding output from said at least one multiplier.

3. An apparatus according to claim 2, wherein said at least one vector component of the primary current includes an excitation current and a torque current.

4. An apparatus according to claim 2, wherein said at least one vector component of the primary current is one of an excitation current and a torque current.

5. An apparatus according to claim 1, wherein said means for detecting the rotational position of the rotary magnetic flux includes: a speed sensor, connected to said induction motor, for outputting a real rotational speed thereof; means for outputting a slip frequency instruction value; means for calculating a rotational speed instruction value of the secondary flux on the basis of the real rotational speed and the slip frequency instruction value; and a vector oscillator for outputting a predictive rotational position of the secondary flux on the basis of the rotational speed instruction value of the secondary flux.

6. An apparatus according to claim 5, wherein a correction current cycle at the flux rotational position is an electric angle of 60° or an integer multiple thereof, or a fraction of an integer thereof.

7. An apparatus according to claim 1, wherein said memory means receives the flux rotational position as an address signal and outputs a correction value corresponding to a real rotational speed.

8. An apparatus according to claim 1, wherein said means for generating the correction value includes an advance compensation circuit.

* * * * *